(12) United States Patent
Woo (10) Patent No.: US 7,780,365 B2
(45) Date of Patent: Aug. 24, 2010

(54) CAMERA MODULE AND METHOD OF MANUFACTURING THE SAME

(75) Inventor: Jae Kun Woo, Yongin-si (KR)

(73) Assignee: LG Innotek Co., Ltd., Seoul (KR)

( * ) Notice: Subject to any disclaimer, the term of this patent is extended or adjusted under 35 U.S.C. 154(b) by 746 days.

(21) Appl. No.: 11/684,927

(22) Filed: Mar. 12, 2007

(65) Prior Publication Data

US 2007/0212061 A1   Sep. 13, 2007

(30) Foreign Application Priority Data

Mar. 10, 2006  (KR) .................. 10-2006-0022840

(51) Int. Cl.
  *G03B 17/02* (2006.01)
  *H04N 5/225* (2006.01)
  *H01R 12/00* (2006.01)
  *H05K 1/00* (2006.01)

(52) U.S. Cl. .................. 396/529; 348/340; 439/83

(58) Field of Classification Search .................. 396/529
See application file for complete search history.

(56) References Cited

U.S. PATENT DOCUMENTS

| | | | |
|---|---|---|---|
| 6,541,284 B2* | 4/2003 | Lam | 438/7 |
| 6,864,116 B1* | 3/2005 | Kim et al. | 438/65 |
| 6,943,423 B2* | 9/2005 | Kim | 257/433 |
| 2007/0117423 A1* | 5/2007 | Kim et al. | 439/83 |
| 2007/0236596 A1* | 10/2007 | Sekine et al. | 348/340 |
| 2007/0241273 A1* | 10/2007 | Kim et al. | 250/239 |

* cited by examiner

*Primary Examiner*—Melissa J Koval
(74) *Attorney, Agent, or Firm*—Saliwanchik, Lloyd & Saliwanchik (57) ABSTRACT

Camera module embodiments and methods of manufacturing camera modules are provided. A camera module can include a housing and a printed circuit board having an image sensor. The housing can be mounted to the printed circuit board using a surface mount technology. In a method of manufacturing the camera module, the image sensor and the housing can be mounted to the printed circuit board, and a lens and a filter can be coupled to an upper portion of the housing.

16 Claims, 5 Drawing Sheets

CAMERA MODULE AND METHOD OF MANUFACTURING THE SAME

CROSS-REFERENCE TO RELATED APPLICATION

The present application claims priority under 35 U.S.C. §119 to Korean Patent Application No. 10-2006-022840 filed on Mar. 10, 2006, which is hereby incorporated by reference in its entirety.

BACKGROUND

As mobile devices are miniaturized and become multi-functioned, components for communication functions, camera functions, and audio reproduction functions are being modularized and remarkably miniaturized. Markedly, mobile devices such as mobile phones and PDAs include a camera function using a compact camera module (CCM).

A CCM includes an image sensor such as a charge coupled device (CCD) or a complementary metal oxide semiconductor (CMOS). The CCM converts light energy into an electric signal using the image sensor to obtain image data. In addition, the image data can be transmitted to and stored in a corresponding device.

Figure 1:
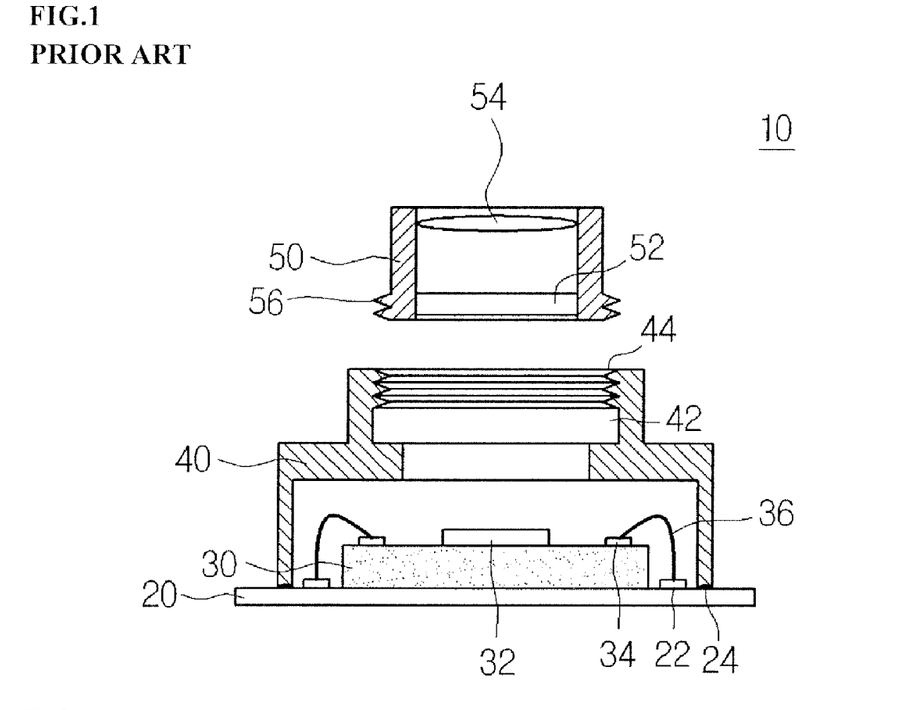
FIG. 1 is a cross-sectional view illustrating a conventional camera module.

FIG. 1 is a cross-sectional view illustrating a conventional camera module 10.

Referring to FIG. 1, the camera module 10 includes a printed circuit board 20, an image sensor 30, a housing 40, and a lens barrel 50.

Passive elements and the like are mounted on the upper surface of the printed circuit board 20 using a surface mount technology (SMT).

The image sensor 30 is disposed on the upper surface of the printed circuit board 20. An epoxy (not shown) is spread to the upper surface of the printed circuit board 20, and then the image sensor 30 is attached on the epoxy. In addition, a plurality of electrode pads 34 of the image sensor 30 are connected to an electrode terminal 22 of the printed circuit board 20 using a wire 36.

In addition, the housing 40 is bonded to the edge of the upper surface of the printed circuit board 20. An epoxy 24 is spread to the edge of the upper surface of the printed circuit board 20, and then the housing 40 is attached on the epoxy 24. The epoxy 24 spread to the edge of the upper surface of the printed circuit board 20 is cured at a predetermined temperature to fix the housing 40.

Meanwhile, the lens barrel 50 including a glass filter 52 and a lens 54 is coupled to an upper portion of the housing 40. For example, a lens barrel thread 56 is formed in the outer surface of the lens barrel 50 and a housing thread 44 is formed in the inner surface 42 of the housing 40. The lens barrel 50 is coupled to the housing 40 using the threads 56 and 44.

In the camera module, a coupling defectiveness between the housing 40 and the printed circuit board 20 may occur according to the amount of the spread epoxy 24 for fixing the printed circuit board 20 to housing 40. For example, when the epoxy 24, which is a spot type epoxy, is spread on the upper surface of the printed circuit board 20, a portion of the housing 40 to which the epoxy 24 is not spread may have a gap. As light enters through the gap between the housing 40 and the printed circuit board 20, the picture quality obtained from the image sensor 30 may deteriorate.

When the epoxy 24 is excessively spread to the edge of the upper surface of the printed circuit board 20, a fixing defectiveness of the housing 40 occurs according to a curing temperature of the epoxy 24 having elasticity and viscosity.

In addition, when the epoxy 24 is excessively spread, the epoxy 24 may get out of the interface between the housing 40 and the printed circuit board 20 and invade the image sensor 30 to contaminate the photo detecting area 32.

In addition, the housing 40 fixed on the printed circuit board 20 may be tilted by viscosity variations of the epoxy 24, and thus the center of the lens 54 placed on the upper portion of the housing 40 is not aligned with the center of a pixel region of the image sensor 30. This results in a defective assembly of the camera module. The housing 40 is tilted to cause a shift in focus. The shift in focus is detected after the camera module is assembled. Therefore, the camera module should be disassembled and the assembly yield is decreased.

BRIEF SUMMARY

An embodiment of the present invention provides a camera module fixing a housing on a printed circuit board using a surface mount technology and a method of manufacturing the same.

An embodiment of the present invention provides a camera module improving assembleability and productivity thereof and inhibiting a housing from being tilted to align the optical axis of an image sensor by fixing the image sensor and the housing to a printed circuit board using the surface mount technology and a method of manufacturing the same.

An embodiment of the present invention provides a camera module comprising an image sensor, a printed circuit board including the image sensor, a housing fixed to the printed circuit board by a surface mount technology (SMT), and a lens part provided with the housing.

An embodiment of the present invention provides a method of manufacturing a camera module, the method comprising attaching an image sensor to a printed circuit board, fixing a housing to the printed circuit board using a surface mount technology (SMT), and coupling a lens part including a lens and a filter to an upper portion of the housing.

According to embodiments of the present invention, the housing can be bonded to the printed circuit board including the image sensor using a metal bonding method. Therefore, light may be prevented from entering between the housing and the printed circuit board, and the tilt of the optical axis may be prevented.

It is to be understood that both the foregoing general description and the following detailed description of the present invention are exemplary and explanatory and are intended to provide further explanation of the invention as claimed.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 2:
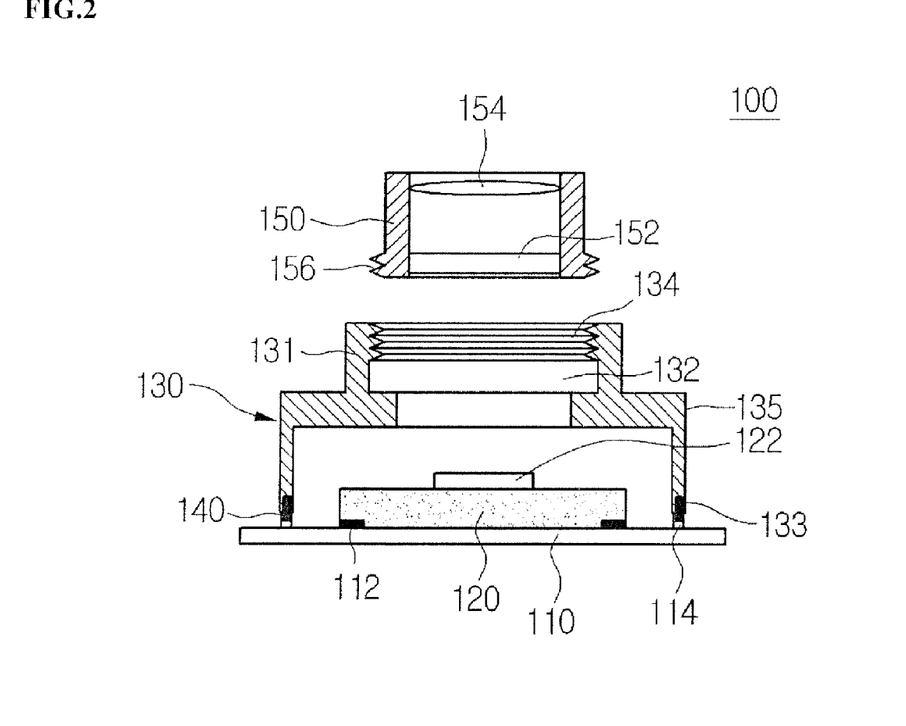
FIG. 2 is a cross-sectional view illustrating a camera module according to an embodiment of the present invention.

FIG. 2 is a cross-sectional view illustrating a camera module 100 according to an embodiment of the present invention.

Referring to FIG. 2, the camera module 100 includes a printed circuit board 110, an image sensor 120, a housing 130, and a lens barrel 150.

The printed circuit board 110 including a predetermined circuit pattern may be a hard printed circuit board or a flexible printed circuit board. The circuit pattern includes electrode terminals 112 and a first mounting portion 114.

The first mounting portion 114 can be a gold (Au) and/or nickel (Ni) plated copper foil pad corresponding to the shape of housing 130 and can be formed along a periphery of the housing 130.

The image sensor 120 includes a photo detecting area 122. Many sensor devices responding to light can be integrated on the image sensor 120.

The image sensor 120 may be a charge coupled device (CCD) or a complementary metal oxide semiconductor (CMOS). The image sensor 120 includes a semiconductor chip packaged using, for example, a ball grid array (BGA), a chip scale (size) package (CSP), or a chip on board (COB) technology. The embodiments will be described with reference to a CSP type image sensor.

The image sensor 120 can convert images captured from the photo detecting area 122 through the lens barrel 150 to electric signals, where the image sensor 120 is attached on an upper surface or a back surface of the printed circuit board 110, thus securing an optical path.

A passive element(s) and the image sensor 120 can be disposed on the upper surface of the printed circuit board 110, where the image sensor 120 can be disposed on the electrode terminal 112 of the printed circuit board 110. In addition, the housing 130 around the image sensor 120 can be disposed on the first mounting portion 114 of the printed circuit board 110.

The housing 130 supplies an optical path to the image sensor 120 disposed on the upper surface of the printed circuit board 110.

A light guide portion 131 is formed on an upper portion of the housing 130, and a support portion 135 is formed on a lower portion of the housing 130.

A second mounting portion 140 is formed at the lower end 133 of the support portion for the support portion 135 to be mounted on the edge of the upper surface of the printed circuit board 110. The second mounting portion 140 may be a metal plate inserted into the support portion 135 when the housing 130 is formed. The gold (Au) and/or nickel (Ni) plated metal plate can have, for example, a circular or a polygonal shape according to the shape of the support portion 135 of the housing 130.

The second mounting portion 140 can be bonded to the first mounting portion 114 formed on the printed circuit board 110 by a surface mounting technology. At this time, solder (not shown) can be interposed between the first mounting portion 114 formed on the printed circuit board 110 and the second mounting portion 140 of the housing 130. The solder is melted at a lower melting temperature than those of the first and second mounting portions 114 and 140 to bond the first mounting portion 114 to the second mounting portion 140.

The solder may be a metal having a lower melting temperature than the metal layers of the first and second mounting portions 114 and 140. For example, the solder may be a soft lead having a lower melting temperature than that of, for example, Pb (e.g., 327° C.) or a hard lead having a melting temperature of 450° C. or more. The solder may be spread on the first mounting portion 114 as a solder paste.

For example, solder powder and a flux can be mixed to obtain the solder paste having an appropriate viscosity for printing. In a specific embodiment, after placing a metal mask on the printed circuit board 110, the solder paste can be squeezed by a squeeze to be spread on the first mounting portion 114 of the printed circuit board 110.

In the camera module, the passive element(s), the image sensor 120, and the housing 130 can be mounted on the printed circuit board 110 using a surface mount technology (SMT).

The lens barrel 150 can be coupled to the inner surface 132 of the light guide portion 131 of the housing 130. For example, a lens barrel thread 156 can be formed in the outer surface of the lens barrel 150 and a housing thread 134 can be formed in the inner surface 132 of the housing 130 such that the lens barrel 150 is coupled in the housing 130 using the threads 156 and 134.

The lens barrel 150 may have a barrel shaped frame and can include a filter 152 and a lens 154. The filter 152 may be located between the image sensor 120 and the lens 154 and can include, for example, a glass filter or an IR (infrared ray) cut filter. The lens 154 can incorporate one or more lenses, and condenses the inputted light on to the photo detecting area 122.

Figure 3:
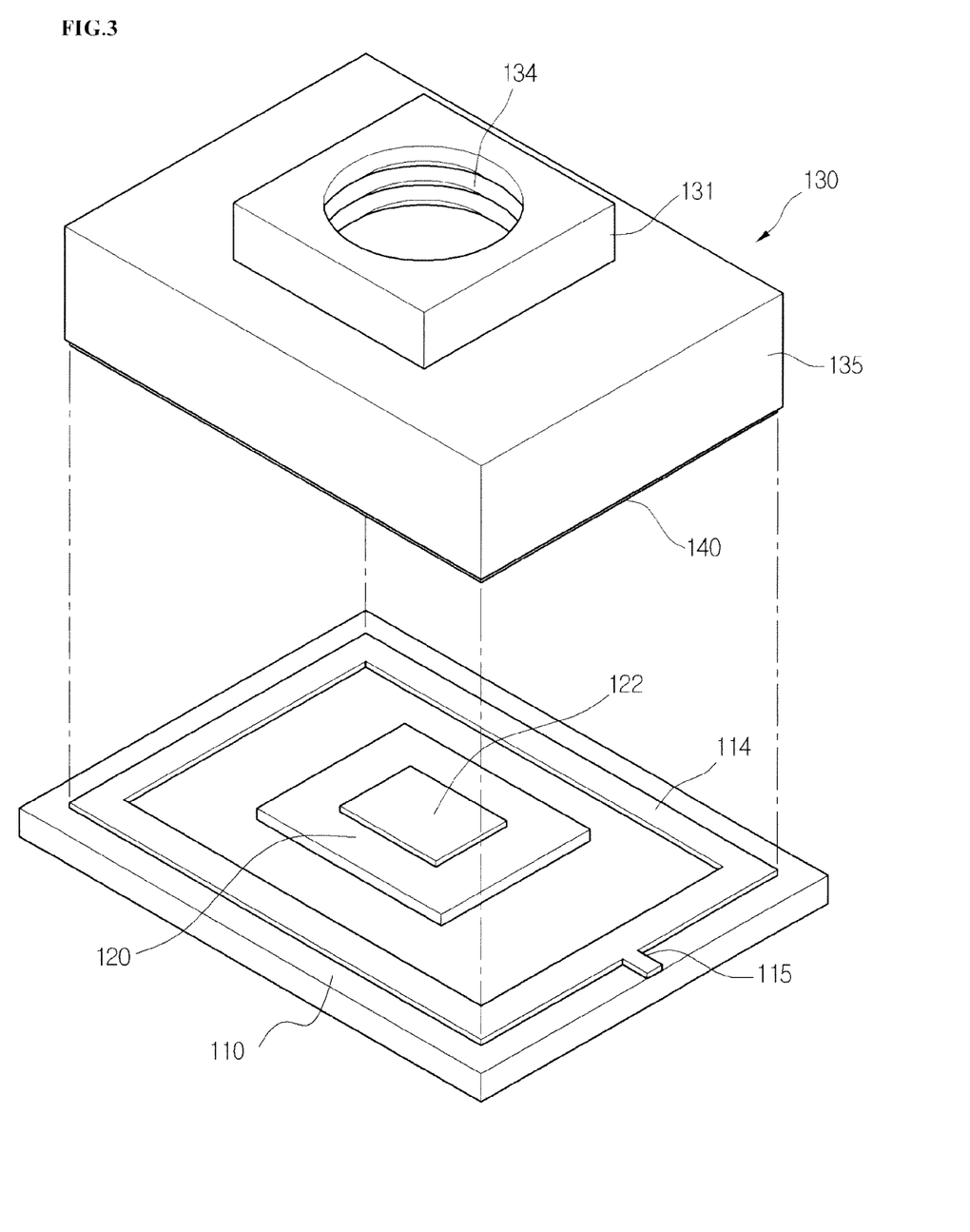
FIG. 3 is an exploded perspective view illustrating a camera module according to an embodiment of the present invention.

FIG. 3 is an exploded perspective view illustrating a camera module according to an embodiment of the present invention.

Referring to FIG. 3, a copper foil can be formed on one side or both sides of an insulation layer to form the printed circuit board 110. The copper foil forms a circuit pattern including the plurality of electrode terminals (not shown) and the first mounting portion 114 using a photolithography process. The region except for the electrode terminals (not shown) and the first mounting portion 114 can be protected by a solder resist.

A plating layer may be formed on the surfaces of the electrode terminal (not shown) of the printed circuit board 110 and the first mounting portion 114. The plating layer of the first mounting portion 114 may be formed when the plating layer of the electrode terminal (not shown) is formed. The reference number 115 indicates a line supplying power for plating.

The image sensor 120 is disposed on a region of the printed circuit board 110, and an image sensor is mounted thereupon. The second mounting portion 140 formed on the bottom surface of the housing 130 can be disposed on the first mounting portion 114 of the printed circuit board 110. In addition, the second bonding portion 140 provided at the lower end of the housing 130 can incorporate an area parallel with a side of the housing 130 and/or a non-parallel area extended from the parallel area. In a further embodiment, the non-parallel area can be further modified by at least one vertical bend.

The passive element(s), the image sensor 120, and the housing 130 can be mounted to the upper surface of the printed circuit board 110 using a surface mount technology (SMT).

As an example of an SMT for the housing 130, solder can be spread after the second mounting portion 140 formed on the bottom surface of the housing 130 is aligned with the first mounting portion 114 of the printed circuit board 110. After that, a heater REFLOW supplies heat and the solder spread on the printed circuit board 110 is melted to bond the first mounting portion 114 to the second mounting portion 140.

The solder is a means for a metal bonding between the first mounting portion 114 and the second mounting portion 140. The solder may be selected considering its attachability, melting point, mechanical properties, and cost. Since a solder bonding type includes Pb, which may cause a nerve disorder in the human body, a lead free solder bonding type is preferably used.

Sn—Cu based, Sn—Ag—Cu based, Sn—Bi based, and Sn—Zn based lead free solders are widely used. For example, the Sn—Cu based lead free solder has a melting point of 227° C., the Sn—Ag—Cu based lead free solder has a process temperature of 218° C.

When the first mounting portion 114 of the printed circuit board 110 is a Cu pad, the attachment defectiveness of the solder to the first mounting portion 114 can be reduced or prevented by selecting an appropriate solder. In addition, the exact amount of the solder can be printed on the surface of the printed circuit board 110 on which the housing 130 is placed.

As illustrated in FIGS. 2 and 3, the housing 130 can be fixed to the edge of the upper surface of the printed circuit board 110 using a metal bonding method and is capable of sealing the outside of the image sensor 120. Therefore, the light except for the light induced through the lens part 154 can be reduced or prevented from being inputted to the photo detecting area 122 of the image sensor 120.

In addition, the housing 130 to which the lens barrel 150 is coupled, can be fixed to the correct position of the printed circuit board 110. Therefore, the optical axis of the lens part 154 over the image sensor 120 can be properly aligned with that of the photo detecting area 122.

Figure 4:
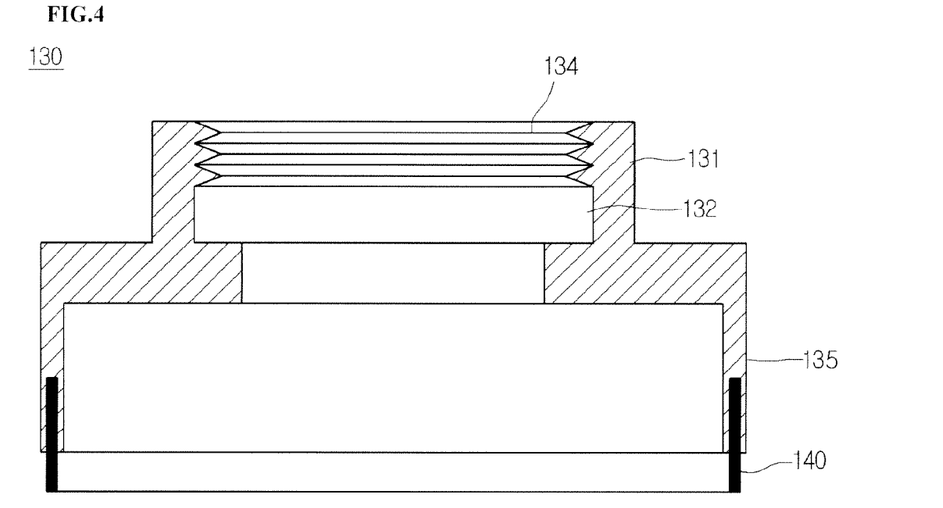
FIG. 4 is a cross-sectional view illustrating one example of a housing according to an embodiment of the present invention.

One example of a housing 130 is illustrated in FIG. 4.

As illustrated in FIG. 4, the second mounting portion 140 protrudes along the lower end of the support portion 135 of the housing 130. In one embodiment, the second mounting portion 140 can be provided and engaged as a single unit with the support portion 135 when the housing 130 is injection molded.

The second mounting portion 140 may be a metal plate or a gold (Au) and/or nickel (Ni) plated metal plate. The shape of the second mounting portion 140 can be a vertical bar type.

Figure 5:
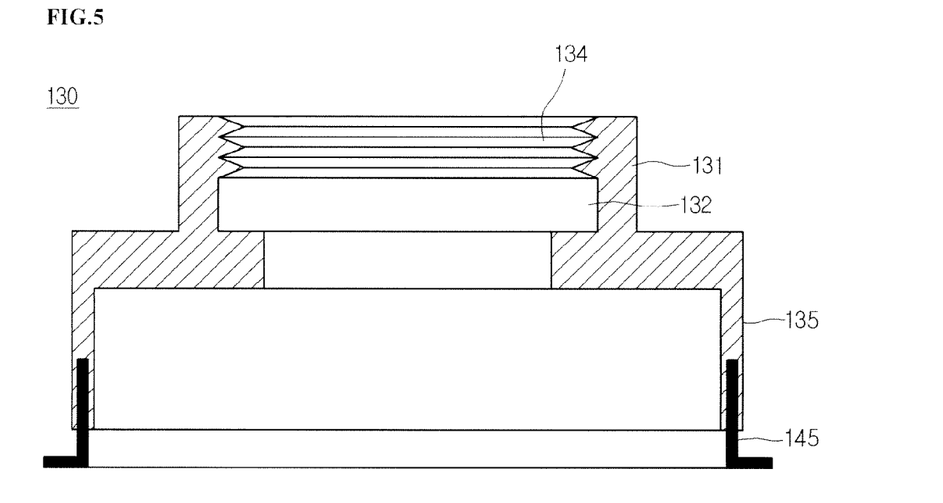
FIGS. 5 AND 6 are cross-sectional views illustrating other examples of a housing according to an embodiment of the present invention.

Another example of a housing 130 is illustrated in FIG. 5.

As illustrated in FIG. 5, a second mounting portion 145 formed at the support portion 135 of the housing 130 can include a lower portion of its vertical plate that bends horizontally outward or inward. The second mounting portion 145 has an area to which the first mounting portion can be bonded. The area of the second mounting portion 145 is larger than that of a simple vertical plate because of the horizontally bending portion.

Figure 6:
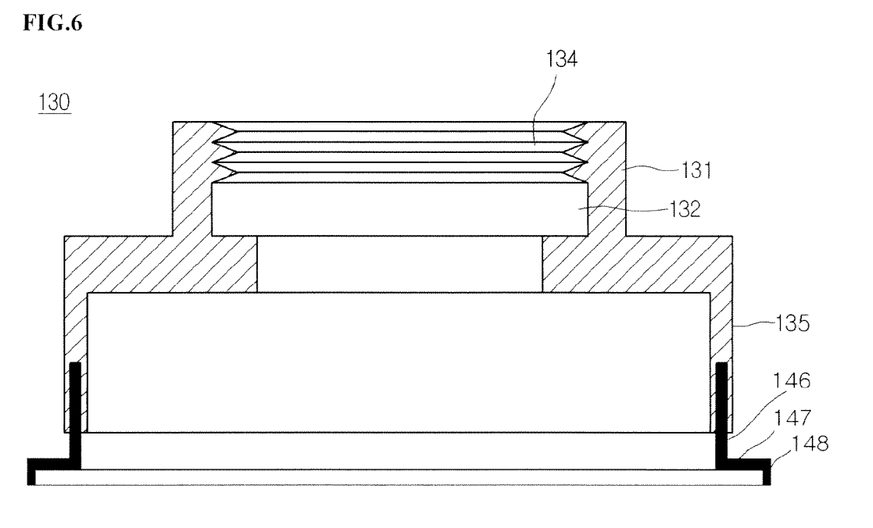

Another example of a housing 130 is illustrated in FIG. 6.

As illustrated in FIG. 6, a second mounting portion 146 formed at the support portion 135 of the housing 130 can include a lower portion of its vertical plate that bends horizontally outward or inward and an end portion of the bent portion vertically bent downward. That is, the second mounting portion 146 can have a stairway shape having one or more bent portions. A horizontal portion 147 bent from the vertical plate can contact an upper surface of the first mounting portion 114 illustrated in FIG. 3. A vertical portion 148 bent from an end portion of the horizontal portion 147 can contact an outer surface of the first mounting portion 114 illustrated in FIG. 3. Therefore, the light from the outside of the housing can be effectively blocked. The vertical portion 148 may have the same or smaller height than the thickness of the first mounting portion 114 illustrated in FIG. 3.

Figure 7:
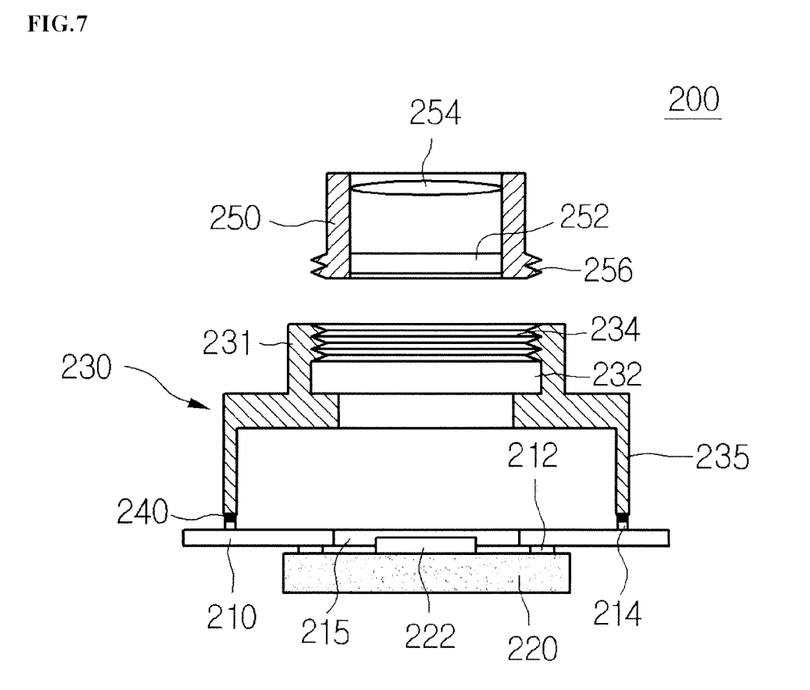
FIG. 7 is a cross-sectional view illustrating another example of a camera module according to an embodiment of the present invention.

FIG. 7 is a cross-sectional view illustrating another example of a camera module 200 according to an embodiment of the present invention. Here, the camera module 200 can be coupled to a substrate using a flip chip bonding method, rather than a wire bonding method.

Referring to FIG. 7, the camera module 200 includes a printed circuit board 210, an image sensor 220, a housing 230, and a lens barrel 250.

A light guide hole 215 can be formed in the printed circuit board 210 in order to secure the optical path of the image sensor 220. A first mounting portion 214 can be formed on the edge of the upper surface of the printed circuit board 210.

The image sensor 220 can be coupled to the printed circuit board 210, with a photo detecting area 222 being at the center of the light guide hole 215 of the printed circuit board 210.

The image sensor 220 can be electrically connected to the printed circuit board 210 through an electrode terminal 212 formed on the back surface of the printed circuit board 210. The gap between the image sensor 220 and the printed circuit board 210 can be filled with a sealant (not shown) to reduce or prevent needless light from being inputted or leaked. The sealant may be, for example, an epoxy or silicon.

The image sensor 220 can be mounted on the back surface of the printed circuit board 210 by a flip chip method (e.g., a chip on film (COF) method). The COF method is a method of attaching various chips to a flexible printed circuit board (FPCB). That is, the gold in an image sensor can be directly bonded to the stannum (Sn) in the FPCB by the COF method by supplying a predetermined heat and pressure. An image sensor is directly bonded to the back surface of an FPCB without an additional means by the COF method. Therefore, compared to a ball grid array (BGA) method, the COF method reduces package costs.

In addition, the size of an FPCB can be reduced to one fourth of a conventional size by the COF method. An FPCB of the COF method can have an area which is just large enough for various parts or chips to be placed on the FPCB. In addition, compared to an anisotropic conductive film (ACF) method the COF method is excellent in product safety and space utilization.

Referring again to FIG. 7, the first mounting portion 214 can be formed on the edge of the upper surface of the printed circuit board 210. The first mounting portion 214 can be bonded to a second mounting portion 240 formed on the lower end of a support portion 235 of the housing 230 by a surface mounting technology using a metal bonding method. The housing may have a size which is larger than that of the sensor guide hole 215 or does not affect the optical path.

In addition, the lens barrel 250 can be coupled to an upper portion of the housing 230. That is, the lens barrel 250 including a filter 252 and a lens 254 can be attached to a light guide portion 231 of the housing 230 using threads 234 and 256. The filter 252 can include, for example, a glass filter or an IR cut filter.

In another embodiment example, the first mounting portion 214 of the printed circuit board 210 can be bonded to the second mounting portion 240 of the housing 230 using an ultrasonic bonding method. The ultrasonic bonding method is a method of bonding the first mounting portion 214 to the second mounting portion 240 by rubbing the first mounting portion 214 of the printed circuit board 210 with the second mounting portion 240 of the housing 230 using a low pressure and a strong ultrasonic vibration. The ultrasonic bonding method can reduce or prevent breakages of the housing 230 and the printed circuit board 210 by the REFLOW process.

In yet another embodiment example, the first mounting portion 214 of the printed circuit board 210 can be bonded to the second mounting portion 240 of the housing 230 by projecting laser beam at contact surfaces of the first and second mounting portions 214 and 240. The method using a laser beam can reduce or prevent breakages of the housing 240.

Figure 8:
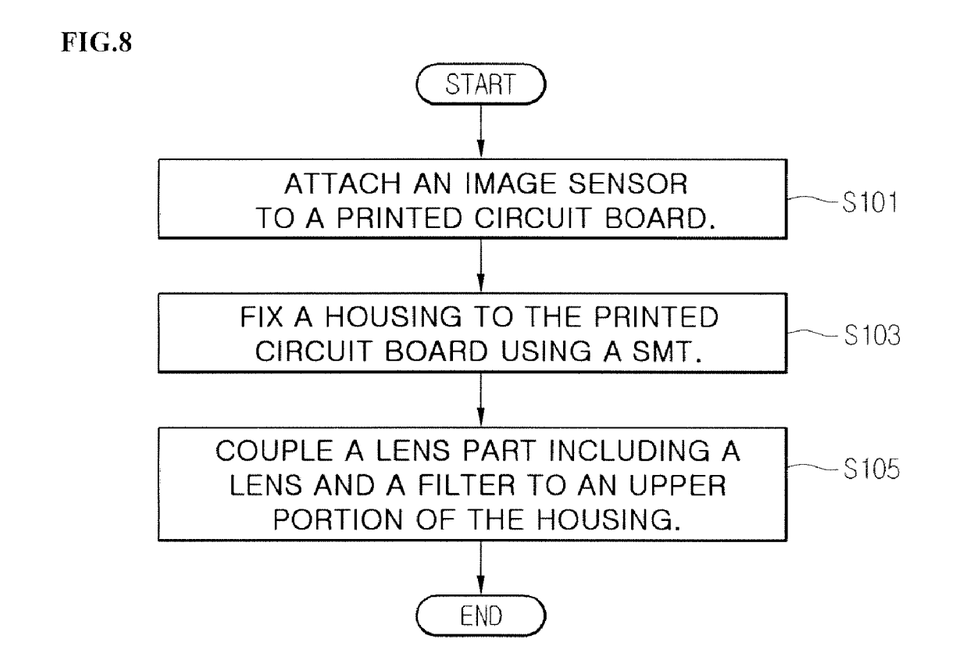
FIG. 8 is a flow chart illustrating a method of manufacturing a camera module according to an embodiment of the present invention.

FIG. 8 is a flow chart illustrating a method of manufacturing a camera module according to an embodiment of the present invention.

Referring to FIG. 8, an image sensor can be attached to a printed circuit board (S101).

The housing can be disposed on an upper surface of a printed circuit board. In operation, light is inputted to the image sensor through the housing of the printed circuit board.

The image sensor and the housing can be fixed to the printed circuit board using a surface mount technology (SMT) (S103). The SMT used to fix the housing to the printed circuit board can involve a method of mounting a metal plate formed at the lower end of the housing to a plated pad formed on the edge of the upper surface of the printed circuit board, such as, for example, a surface mounting technology for a solder bonding. When the image sensor and the housing are mounted to the printed circuit board using the SMT, the image sensor is located in the housing, and an optical path arrives at the image sensor through an upper portion of the housing.

A lens barrel can be coupled to the housing (S105). The lens barrel can be coupled to the upper portion of the housing without invading the optical path. Here, the lens barrel can be coupled to the upper portion of the housing before or after the metal bonding of the SMT.

The camera module according to an embodiment of the present invention reduces the number of a camera module manufacturing processes by mounting various elements, the image sensor, and the housing to the printed circuit board using SMT. In addition, the camera module according to an embodiment of the present invention is capable of securing the reliability of the image quality of the camera module by reducing or preventing stray light from being introduced to the image sensor because of the mounted housing.

In addition, the center of the lens can be exactly aligned with the center of the image sensor because the housing can be coupled to the printed circuit board without tilting. Therefore, the assembly accuracy of the camera module can be improved to prevent the inferiority of the picture quality caused by missing the focus and the contamination of the image sensor caused by an epoxy adhesive.

In addition, compared to an epoxy bonding of the housing to the printed circuit board, the camera module according to an embodiment of the present invention reduces or prevents the contamination of an image sensing portion typically caused by an epoxy, and greatly reduces an epoxy curing time to improve the yield of the camera module process.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
   a printed circuit board;
   an image sensor electrically coupled to the printed circuit board;
   a housing fixed to the printed circuit board; and
   a lens part coupled to the housing,
   wherein an upper surface of the printed circuit board comprises a first mounting portion and a lower end of the housing comprises a second mounting portion, wherein the first mounting portion and the second mounting portion correspond to each other.

2. The camera module according to claim 1, wherein the image sensor is electrically coupled to an upper surface of the printed circuit board.

3. The camera module according to claim 1, wherein the image sensor is electrically coupled to a back surface of the printed circuit board.

4. The camera module according to claim 1, wherein the first and second mounting portions form a circular or a polygonal shape.

5. The camera module according to claim 1, wherein the first mounting portion is formed of a metal pad and the second mounting portion is formed of a metal plate.

6. The camera module according to claim 5, wherein the metal pad and the metal plate are made of copper or copper plated with gold and/or nickel.

7. The camera module according to claim 1, wherein at least a portion of the second mounting portion is provided at the lower end of the housing parallel with a side of the housing.

8. The camera module according to claim 7, wherein the second mounting portion further comprises a non-parallel area extended from the parallel area.

9. The camera module according to claim 7, wherein the at least a portion of the second mounting portion is at least partially formed within the lower end of the housing.

10. The camera module according to claim 8, wherein the second mounting portion further comprises at least one vertical bend at an edge of the non-parallel area.

11. The camera module according to claim 1, further comprising: a solder between the first mounting portion and the second mounting portion, wherein the solder is made from at least one of lead, a Sn—Cu based alloy, a Sn—Ag—Cu based alloy, a Sn—Bi based alloy, or a Sn—Zn based alloy.

12. A method of manufacturing a camera module, the method comprising:
   attaching an image sensor to a printed circuit board;
   fixing a housing to the printed circuit board using a surface mount technology (SMT); and
   coupling a lens part comprising a lens and a filter to an upper portion of the housing.

13. The method according to claim 12, wherein the image sensor is a ball grid array type, a chip scale (size) package type, or a chip on board type.

14. The method according to claim 12, wherein the fixing of the housing comprises:
spreading a solder on either a first mounting portion provided on an upper surface of the printed circuit board or a second mounting portion provided on a lower end of the housing;
aligning the housing and the printed circuit board having the mounting portions being formed to correspond each other;
mounting the housing on the upper surface of the printed circuit board; and
performing a reflow process.

15. The method according to claim 14, wherein the first mounting portion of the printed circuit board and the second mounting portion of the housing form a circular or a polygonal shape.

16. The method according to claim 14, wherein the second mounting portion is provided and engaged with the housing when the housing is injection molded.

* * * * *